J. A. JOHNTRY.
Dust-Shovel.
No. 203,277.  Patented May 7, 1878.
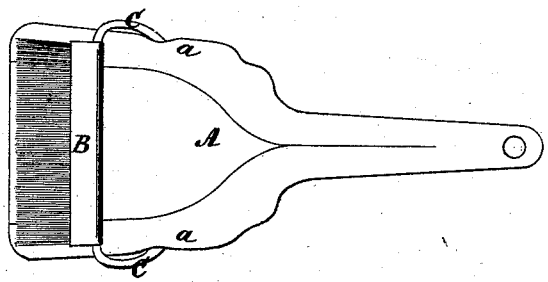
Witnesses.  
Wm Lyons  
William Ehrit
Inventor.  
Jacob A. Johntry  
per Weury & Roeder  
Attorney.

UNITED STATES PATENT OFFICE.

JACOB A. JOHNTRY, OF BROOKLYN, NEW YORK, ASSIGNOR TO EDWARD W. OWEN, OF SAME PLACE.

IMPROVEMENT IN DUST-SHOVELS.

Specification forming part of Letters Patent No. 203,277, dated May 7, 1878; application filed December 6, 1877.

*To all whom it may concern:*

Be it known that I, JACOB A. JOHNTRY, of the city of Brooklyn, in the State of New York, have invented a new and useful Improvement in Shovels, which improvement is fully set forth in the following specification, reference being had to the accompanying drawings.

Figure I represents a longitudinal section of a shovel with my improvement attached, and Fig. II is a top view of the same.

The nature of my invention consists in combining with a dust, sink, or other shovel, a brush, or its equivalent, arranged and attached by suitable arms, inclined to the surface of the shovel, so that by turning the shovel with the brush downward, the dust or refuse in the sink can be swept together, and by turning the shovel around can easily be taken up by the same, thereby combining two articles into one, and saving considerable labor.

In the accompanying drawing, A represents a shovel, which may be made of any desired construction. On the side flanges *a* of the same arms C are firmly attached, inclined to the face of the shovel or at an angle thereto, pointing forward, and supporting at their ends a brush, B, extending nearly across the whole surface of the shovel.

When the shovel is turned so that the brush B will be downward, dust or refuse in a sink or any other place can easily be swept together, to be taken up by the shovel after the same has been turned around again. Instead of the brush B, a flexible material, such as cloth or india-rubber, may be used for the same purpose.

What I claim as my invention, and desire to secure by Letters Patent, is—

As a new article of manufacture, the improved implement described, composed of the shovel A and brush B, jointly, the two devices being permanently attached together by means of suitable arms C, inclined or at an angle to the surface of the shovel, substantially as described.

JACOB A. JOHNTRY.

Witnesses:
HENRY E. ROEDER,
E. W. OWEN.